March 30, 1971     L. L. VALKA     3,573,311
METHOD OF PRODUCING N-AMINOETHYLPIPERAZINE
Filed Sept. 25, 1968
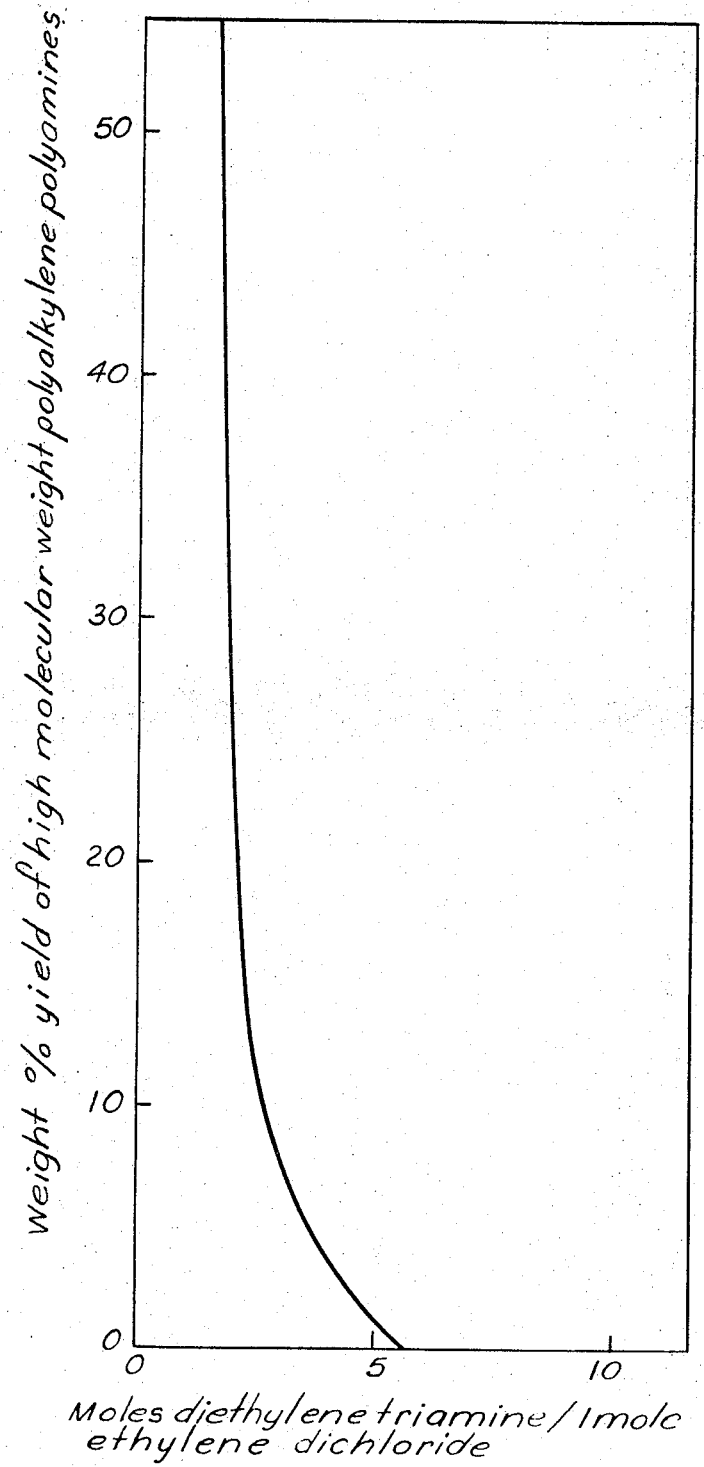
INVENTOR.
Leonard L. Valka
BY
J R Lochhead
ATTORNEY United States Patent Office 3,573,311
Patented Mar. 30, 1971

3,573,311
METHOD OF PRODUCING N-AMINOETHYL-PIPERAZINE
Leonard L. Valka, Angleton, Tex., assignor to The Dow Chemical Company, Midland, Mich.
Filed Sept. 25, 1968, Ser. No. 762,533
Int. Cl. C07d 51/70
U.S. Cl. 260—268            7 Claims

ABSTRACT OF THE DISCLOSURE

A method of producing N-aminoethylpiperazine which comprises reacting diethylenetriamine (D.E.T.A.) and ethylene dichloride (E.D.C.) in the critical molar ratios (D.E.T.A./E.D.C.) of 4/1 to 20/1, said reaction resulting in the production of little or none of the heretofore expected high molecular weight linear condensation products.

BACKGROUND OF THE INVENTION

The reaction of diethylenetriamine (D.E.T.A.) with ethylene dichloride (E.D.C.) to obtain high molecular weight polyethylenepolyamines is well known in the art. References such as U.S. Pats. 2,696,504, 2,765,228, 2,839,417, 3,098,697 and 3,219,578 teach such inert media as water, alcohols and ethylene glycol; reaction temperatures from about 60°–190° C.; and molar ratios of D.E.T.A./E.D.C. of from about 0.01/1 to about 4/1. The references also teach the addition to the reaction product of caustic (to neutralize HCl) intermittently during various stages of condensation, or concurrently with the addition of E.D.C.

SUMMARY OF THE INVENTION

The instant invention is the surprising discovery that when D.E.T.A. and E.D.C. are reacted in molar ratios of at least 4/1, a high yield of N-aminoethylpiperazine (A.E.P.) results, with little or no formation of high molecular weight polyethylenepolyamines.

More precisely, the instant invention comprises a method for producing A.E.P., which comprises reacting by contacting E.D.C. with 4 to 20 molar equivalents of D.E.T.A., preferably 5 to 10 molar equivalents, at a temperature of about 50°–150° C., preferably about 80°–120° C.

After the E.D.C. is added, a digestion period of from about 5 minutes to 3 hours is advisable, but not critical. If too little time is allowed, very little conversion of D.E.T.A. will occur. On the other hand, if too much contact time as allowed, the chance of further reaction of the products increases.

After the reaction has subsided, the acid salt formed should be neutralized by a suitable base. Examples are KOH, NaOH and NH$_4$OH.

Following neutralization, the A.E.P. can be separated and removed by techniques well known in the art such as distillation.

The reaction may be carried out in an unreactive medium with agitation and controlled temperature. For instance, water, while not reacting with the reactants, surprisingly has an accelerating effect on the reaction. For best results, the temperature is not allowed to go below about 60° C., or over about 150° C. Heat can suitably be added or removed as the reaction progresses, to prevent either chilling or exothermic heat build-up. Suitable inert media include water, benzene and alkanols containing from two to about ten carbon atoms, such as ethyl, propyl, butyl and octyl. Mixtures of water and alcohols are also suitable.

As stated above, the critical feature of this invention is the molar ratio of the reactants, i.e., D.E.T.A. and E.D.C. At molar ratios of D.E.T.A./E.D.C. of 4/1 to 5/1, little high molecular weight polyamine material is formed, while at ratios above 5/1 almost none is formed, as is shown in the drawing. Although the reaction is operable at a ratio above 20/1, the percent conversion of D.E.T.A. diminishes, as is to be expected.

The method of this invention has been found to be conveniently and economically adaptable to being run continuously. The D.E.T.A. and E.D.C. are mixed in the desired ratio at or near the beginning of, for instance, a coil reactor and the temperature is controlled by adding or withdrawing heat from the coil. Residence time in the coil reactor is generally shorter than the reaction time required in large batch reactions because of easier control of exotherm. In large batch reactors, control of exotherm is managed in part by controlling the rate of addition of E.D.C. to D.E.T.A.

SPECIFIC EMBODIMENTS

Example 1

A 22-liter glass reactor, equipped with stirrer, thermometer, dropping funnel, reflux condenser and heated with a heating mantle was used for this experiment.

The flask was chaged with 8000 grams of 99.3% pure D.E.T.A. and heated to 72° C. 1540 grams of E.D.C. was added dropwise, with stirring, over a period of about 7 hours. (The nominal D.E.T.A./E.D.C. molar ratio was about 5.1/1.) During this addition, the temperature reached 95° C. due to the exotherm. Agitation was continued for another 5 hours.

Approximately one liter of the reaction mixture was removed from the reactor and neutralized with 70% aqueous NaOH solution until an amine layer was formed. A slight excess of base was used.

A sample of the amine layer was analyzed and found to contain by weight, 66.45% D.E.T.A., 13.65% A.E.P., 17.66% pentaethylhexamine (P.E.H.A.), 0.5% tetraethylpentaamine (T.E.P.A.), 1.58% H$_2$O, the remainder being trace amounts of other low molecular weight amines. No appreciable amount of high molecular weight (300 and above) amines was found in the reaction product.

Example 2

The following experiments were run in the same way as Example 1, except that the reactions were controlled at 80° C. throughout. Runs No. A, B and C below are for comparison only. The last three columns report analysis of product by weight percent.

TABLE I

| Run No. | Ratio of D.E.T.A./ E.D.C. | Wt. percent conv. of D.E.T.A. | Wt. percent of A.E.P. | Wt. percent of P.E.H.A.* | Wt. percent of high M.W. amines |
|---|---|---|---|---|---|
| A | 1.55/1 | 60.6 | 6.7 | 42 | 50 |
| B | 2.0/1 | 43.8 | 18.3 | 48 | 31 |
| C | 3.25/1 | 37.1 | 49.0 | 46 | 3 |
| D | 5.0/1 | 23.5 | 58.9 | 39 | 1 |
| E | 10.0/1 | 10.8 | 70.8 | 28 | 0 |
| F | 20.0/1 | 5.3 | 77.7 | 22 | 0 |

*This is actually amines which boil close to P.E.H.A., primarily P.E.H.A. and its isomers.

Example 3

A coil reactor was employed for the following runs. The reactor was made of stainless steel tubing (0.2" I.D.) which had been coiled and placed in a vessel containing a heat-transfer liquid. The inlet of the coil was fed by three reservoirs; one for diluent, one for E.D.C., and one for D.E.T.A. The outlet of the coil fed into a reservoir where the reaction mixture could be collected and then transferred to other vessels for subsequent treatment.

In these runs, the reaction mixture was treated with aqueous caustic as in the prior examples. The data in Table II are representative of the continuous procedure and results in each run. In all cases, the production of high molecular weight polyethylenepolyamines was negligible or nil.

TABLE II

| | Reactor feed | | | | Reactor conditions | | Product yields | | |
|---|---|---|---|---|---|---|---|---|---|
| Run No. | E.D.C., cc./min. | D.E.T.A., cc./min. | Mole ratio D.E.T.A./E.D.C. | Water, cc./min. | Contact time,* min. | Bath temp. | Wt. percent conv. D.E.T.A. | Wt. percent A.E.P. | Wt. percent other |
| A | 6.2 | 42.5 | 5 | 5.4 | 5 | 100 | 21.1 | 45.5 | 54.5 |
| B | 6.15 | 42.5 | 5 | 5.4 | 5 | 100 | 20.3 | 42.8 | 57.2 |
| C | 6.8 | 48 | 5 | 4.4 | 10.1 | 80 | 22.1 | 63.6 | 36.4 |
| D | 4.6 | 32 | 5 | 2.8 | 27.9 | 80 | 27.1 | 52.9 | 47.1 |
| E | 3.3 | 45.1 | 10 | 5.4 | 5 | 100 | 10.5 | 51.5 | 48.5 |
| F | 4.3 | 44.3 | 7.5 | 5.0 | 5 | 100 | 12.9 | 46.4 | 43.6 |
| G | 1.2 | 17 | 10 | 0 | 60 | 80 | 10.0 | 55 | 45 |
| H | 5.3 | 36.5 | 5 | 12.1 | 5 | 100 | 24.9 | 46.8 | 53.2 |
| I | 4.8 | 33.0 | 5 | 16.4 | 5 | 100 | 26.2 | 35.8 | 64.2 |

*Contact time was varied by changing the input feed times, or the length of the reactor.

I claim:
1. A method for producing N-aminoethylpiperazine, which comprises reacting by contacting ethylene dichloride with 4.0 to 20.0 molar equivalents of diethylenetriamine at from 50°–150° C., and recovering N-aminoethylpiperazine from the resulting mixture.
2. The method of claim 1 wherein the mixture is maintained at 80°–120° C.
3. The method of claim 1 wherein the molar equivalents of diethylenetriamine are 5 to 10.
4. The method of claim 1 wherein the process is carried on in a batch-wise manner.
5. The method of claim 1 wherein the reactants are continuously fed into a reaction, maintained at a temperature of 50°–150° C., and the products continuously removed therefrom.
6. The method of claim 1 wherein the reaction is carried out in the presence of water.
7. A method for producing N-aminoethylpiperazine, which comprises reacting by contacting ethylene dichloride with 4.0 to 20.0 molar equivalents of diethylenetriamine at from 50°–150° C., neutralizing the product mixture with a base, and removing the N-aminoethylpiperazine by distillation.

References Cited

UNITED STATES PATENTS

| 2,696,504 | 12/1954 | Yost et al. | 260—553 |
| 2,765,228 | 10/1956 | Jordan | 92—3 |
| 2,839,417 | 6/1958 | Tousighant et al. | 106—123 |
| 2,985,658 | 5/1961 | Krause | 260—268 |
| 3,098,697 | 7/1963 | Cappuccio | 18—54 |
| 3,219,578 | 11/1965 | Cruickshank et al. | 210—52 |
| 3,462,493 | 8/1969 | Coker et al. | 260—268X |

DONALD G. DAUS, Primary Examiner

U.S. Cl. X.R.

260—583